United States Patent [19]

Gagliardo et al.

[11] Patent Number: 5,408,641
[45] Date of Patent: Apr. 18, 1995

[54] PROGRAMMABLE DATA TRANSFER TIMING

[75] Inventors: Michael A. Gagliardo, Shrewsbury; John J. Lynch, Wayland; James E. Tessari, Arlington, all of Mass.

[73] Assignee: Digital Equipment Corporation, Maynard, Mass.

[21] Appl. No.: 221,663

[22] Filed: Apr. 1, 1994

Related U.S. Application Data

[62] Division of Ser. No. 303,624, Jan. 27, 1989.

[51] Int. Cl.$^6$ ............................................. G06F 13/00
[52] U.S. Cl. .................... 395/550; 395/500; 395/325; 364/DIG. 1; 364/271; 364/271.5; 364/270.3
[58] Field of Search ........................................ 395/550

[56] References Cited

U.S. PATENT DOCUMENTS

| | | | |
|---|---|---|---|
| Re. 30,331 | 7/1980 | Sorensen et al. | 364/200 |
| 3,688,650 | 6/1972 | Wang | 340/172.5 |
| 3,895,360 | 7/1975 | Cricchi et al. | 360/173 R |
| 4,014,006 | 3/1977 | Sorensen et al. | 340/172.5 |
| 4,021,784 | 5/1977 | Kimbinger | 340/172.5 |
| 4,050,097 | 9/1977 | Niu et al. | 364/200 |
| 4,079,456 | 3/1978 | Lunsford et al. | 364/200 |
| 4,095,265 | 6/1978 | Verba | 364/200 |
| 4,124,890 | 11/1978 | Vasenkov et al. | 364/200 |
| 4,153,941 | 5/1979 | Caddell | 364/900 |
| 4,370,733 | 1/1983 | Gaudio | 364/900 |
| 4,386,401 | 5/1983 | O'Brien | 364/200 |
| 4,393,458 | 7/1983 | Fung | 364/900 |
| 4,405,898 | 9/1983 | Flemming | 328/72 |
| 4,415,984 | 11/1983 | Gryger et al. | 364/900 |

Primary Examiner—Gareth D. Shaw
Assistant Examiner—Kakali Chaki
Attorney, Agent, or Firm—Krishnendu Gupta; Ronald C. Hudgens; Arthur W. Fisher

[57] ABSTRACT

A method and apparatus for providing asynchronous communication between at least one central processing unit (CPU) and at least one associated memory unit with specially programmed timing signals to latch, select and transmit data between them.

9 Claims, 3 Drawing Sheets

PROGRAMMABLE DATA TRANSFER TIMING

This is a divisional of application Ser. No. 07/303,624, filed on Jan. 27, 1989.

FIELD OF THE INVENTION

The present invention relates to data processing systems, and more particularly to data processing systems wherein at least one central processing unit thereof operates asynchronously with at least one memory source unit thereof.

BACKGROUND OF THE INVENTION

In most conventional data processing systems, a central processor unit (CPU) thereof is generally arranged to operate with its associated memory source units at a synchronous rate which is related to the speed of operation of the memory unit. The memory functions are controlled by the CPU, and the two units are then synchronously operated by the use of appropriate timing signals communicated therebetween.

In such apparatus, the data processing system functions by transferring data among its internal registers, its memory, and its input-output (I/O) devices. The transferring of data involves movement of data between a source and a destination, either directly or through intervening units, such as an arithmetic logic unit (ALU), which appropriately modify the data which is being transferred. The transferring of data with I/O devices occurs over at least one memory bus. In addition, the apparatus has an appropriate independent memory address bus for transferring memory address data.

When memory units associated with the CPU lack synchronous clocks, it is desirable to operate the CPU asynchronously with the memory units, because each of the memory units may operate at a different speed, independent of the CPU operatory speed.

In prior art data processing systems each CPU thereof operates either synchronously or asynchronously with its associated memory units. In the former case, a single clock source is utilized to assure that correct sequencing of the overall data processing operation occurs. In such systems both the CPU and the associated memory units are timed directly from the same clock source. In the latter case, separately and effectively independently operated timing systems, or clocks, are used in the CPU and in its associated memory units. In such asynchronous systems there is no effective relationship between the independently operating clocks. In order to assure that the desired sequence of operations occurs in the CPU and each associated memory unit, the synchronizing of their operations is usually accomplished through appropriate sensing of operating state changes as certain operating signals pass from one binary level to another, such as an edge sensitive synchronizing operations, for example. Relatively elaborate sensing and synchronizing circuitry is usually required for such purpose, and its implementation is relatively expensive.

With most presently known asynchronously operated data processing systems, at least one CPU, and associated control signals used to coordinate its operation with that of its associated memory units are configured so that once a CPU initiates the operation of an associated memory unit, operation of the CPU is effectively halted until an appropriate control signal is received from the associated memory unit to permit resumption of the CPU operations. In such an arrangement, the overall processing time is increased over that which would be required if the CPU were permitted to proceed with at least certain operations simultaneously with the operation of its associated memory units.

In other known data processing apparatus, asynchronous operation is achieved with CPU and associated memory unit clock signals having predetermined phase relationships with each other. The timing between the separate clock pulses of a CPU and each of its associated memory units is asynchronous in the sense that the CPU can operate with associated memory units having different operating speeds, while at the same time the overall timing of each memory unit is made adaptively synchronous to that of its associated CPU because of the predetermined phase relationship between their respective clock pulses. Although this system allows the operation of various memory units at different speeds with a single CPU, separate clocks with a fixed phase relationship are required. In addition, this arrangement requires a clock distribution cable and interface arrangement between the CPU and its associated memory units, just as is the case with synchronous systems. The elimination of this costly addition to the computer system is highly desirable.

SUMMARY OF THE INVENTION

The present invention provides asynchronous operation of a CPU by using specially programmed timing signals in the CPU to latch, select and transmit data from a variety of different memory source units. The memory units have no timing signals of their own, and instead operate synchronously in response to the specially phased timing signals in the CPU. Since the period required to latch, select and transmit data from a particular memory unit depends upon the transmission reception delays between the CPU and selected memory unit as well as the speed of the selected memory unit, the time delay due to phasing between the timing signals transmitted to each selected memory unit is programmed to force the CPU to read the data which is received after the delay in a subsequent valid data reading window of the CPU timing cycle. When the delay in the transmission-reception path is greater than the period of a single CPU timing cycle, the CPU reads incoming data from the selected memory unit during the data reading window of a subsequent CPU timing cycle. The programmed delays are chosen to provide such delay periods. When the transmission-reception delays are insignificant compared to the CPU timing cycle, no delay is programmed. Likewise, when the transmission-reception delay is sufficient to delay the received data within the data reading window of a subsequent CPU timing cycle, no delay is programmed. However, even when no delay is programmed, the identification of the memory units which require no programmed delays have their addresses programmed for identification purposes.

The transfer of information from each memory unit is thereby initiated and completed by the associated CPU. Proper select-read memory timing is guaranteed with programmed phase shifts in the CPU for each memory unit to be selected.

DETAILED DESCRIPTION OF THE PREFERRED EMBODIMENT

Figure 1:
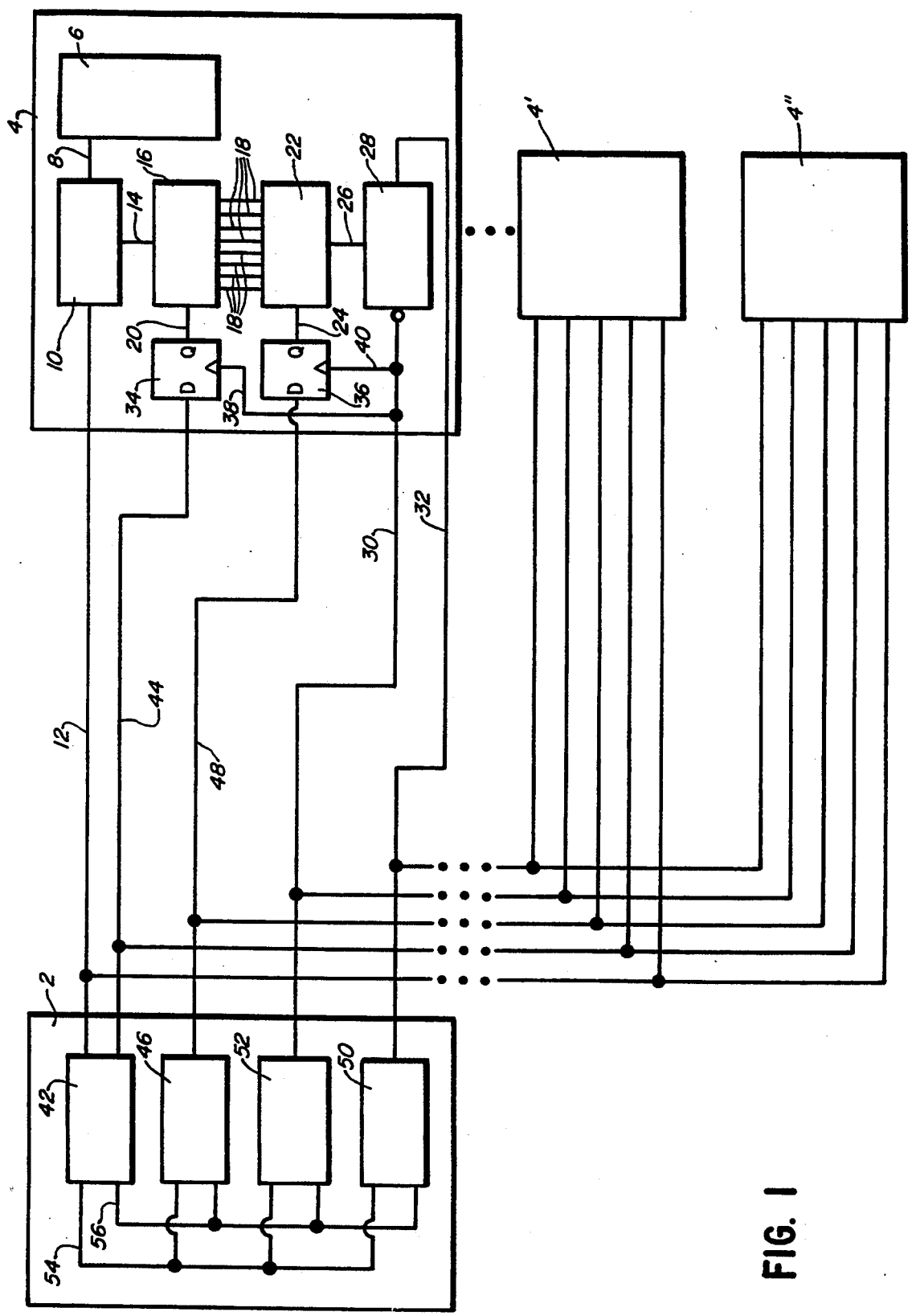
FIG. 1 is a typical system block diagram of a data processing system suitable for incorporating the present invention.

Referring to the drawings, wherein like reference characters designate like or corresponding parts throughout the views, FIG. 1 shows a typical system block diagram of a data processing (digital computer) system including a CPU 2 and a memory unit 4. Of course, it is well known that more than one memory unit 4 will typically be associated with the CPU 2 as represented generally by additional memory units 4' and 4" in FIG. 1. Likewise, it is well known that the computer system may also incorporate more than one CPU 2. One CPU 2 is shown in detail with one memory unit 4 in FIG. 1 for purposes of illustrative clarity only.

The memory unit 4 typically includes at least one dynamic random access memory unit (DRAM) 6 which typically provides a serial data output on a line 8. The serial output of each DRAM 6 may be a 40 bit serial data stream, for instance. The DRAM 6 has its output on line 8 fed to a serial data latch 10, which selectively latches the serial data stream on the output of the DRAM 6 when the serial data latch 10 is latched with a latch signal on a first latch line 12. The serial data latch 10 has a latched serial data output on a line 14 which feeds a data word latch 16. The data word latch 16 converts the latched serial data output on the line 14 to a plurality of multi-bit data words, each word on a corresponding one of a plurality of data word output lines 18. Although the data words latched by the data word latch 16 may be of any selected bit length with a corresponding number of data word output lines 18, the data words typically have a bit length of 5, requiring the use of at least 8 output lines 18 if the latched serial data output on the line 14 is 40 bits in length, as shown in FIG. 1. The data word latch 16 is latched with a latch signal on a second latch line 20. The data word outputs on the lines 18 are fed into a multi-bit data word input multiplexer 22, which selects one of the multi-bit data words on one of the data word lines 18 with a select signal supplied on a select signal input line 24. The multiplexer 22 feeds the selected multi-bit data word on a multiplexer output line 26. The selected multi-bit data word on the multiplexer output line 26 is fed into a data word transmit latch 28. The transmit latch 28 latches the multi-bit data word on the multiplexer output line 26 with a transmit latch signal on a transmit latch line 30. The latched data word is transmitted from the transmit latch 28 along a transmit latch output line 32. The DRAM 6, serial data latch 10, data word latch 16, muliplexer 22 and data word transmit latch 28 are well known components which may be interconnected in a variety of well known configurations and are shown in block form for purposes of representation only, since they do not in themselves constitute part of the present invention.

The latch signal on the second latch line 20 and the select signal on the select signal input line 24 are both gated by respective first and second data flip-flops 34, 36 which have their non-inverted Q outputs supplying lines 20 and 24 respectively. The first data flip flop 34 has an inverted clock input fed by a first clock input line 38, and the second data flip flop 36 has an inverted clock input fed by a second clock input line 40. The first and second clock input lines connect to the transmit latch line 30, so that the status of the first and second flip flops 34, 36 cannot change state whenever the transmit latch signal on the transmit latch line 30 is asserted. This gating feature prevents the data word latch 16 and the multi-bit data word multiplexer 22 from shifting their outputs when the transmit latch signal is asserted on the transmit latch line 30.

The CPU 2 includes a latch control circuit 42 which provides the latch signals on the first latch line 12, to the serial data latch 10 and on a first flip flop input line 44 to the data D input of the first data flip flop 34 with its Q output on the second latch line 20 to the data word latch 16. Thus, the latch control circuit 42 controls the latching operations of both the serial data latch 10 and the data word latch 16. A selector circuit 46 provides the select signal on a second flip flop input line 48 to the data D input of the second data flip flop 36 with its Q output on the select signal line 24 to the data word input muliplexer 22. A memory receive circuit 50 receives the latched data word on the output line 32 from the transmit latch 28.

A CPU clock control unit 52 provides timing signals for controlling both the CPU 2 and the memory unit 4. The clock control unit 52 supplies a first cyclic reference timing signal on a first timing line 54 and a second cyclic reference timing signal on a second timing line 56 to the latch control circuit 42 to synchronize the first and second latch signals from the latch control circuit 42 on the lines 12 and 44 respectively. The first reference timing signal on the line 54 in FIG. 1 is graphically represented by a line 58 in FIG. 2, and the second reference timing signal on the line 56 in FIG. 1 is graphically represented by a line 60 in FIG. 2.

The first reference signal represented by the line 58 includes a cyclic pulse train of timing pulses 62 which designate the initial phase of each timing cycle for the CPU 2. The timing pulses 62 have intervals between them on the order of ⅛ of the timing cycle. The second reference timing signal represented by the line 60 is a generally symmetrical digital waveform comprising a pulse train of timing pulses 64 with an approximately fifty percent duty cycle, and which pulse train has a cyclic frequency corresponding to the frequency of the timing cycle for the CPU 2. The relative phases of the first timing signal represented by the line 58 and the second timing signal represented by the line 60 may be shifted relative to each other, to suit the convenience of any desired circuit timing arrangements.

Figure 2:
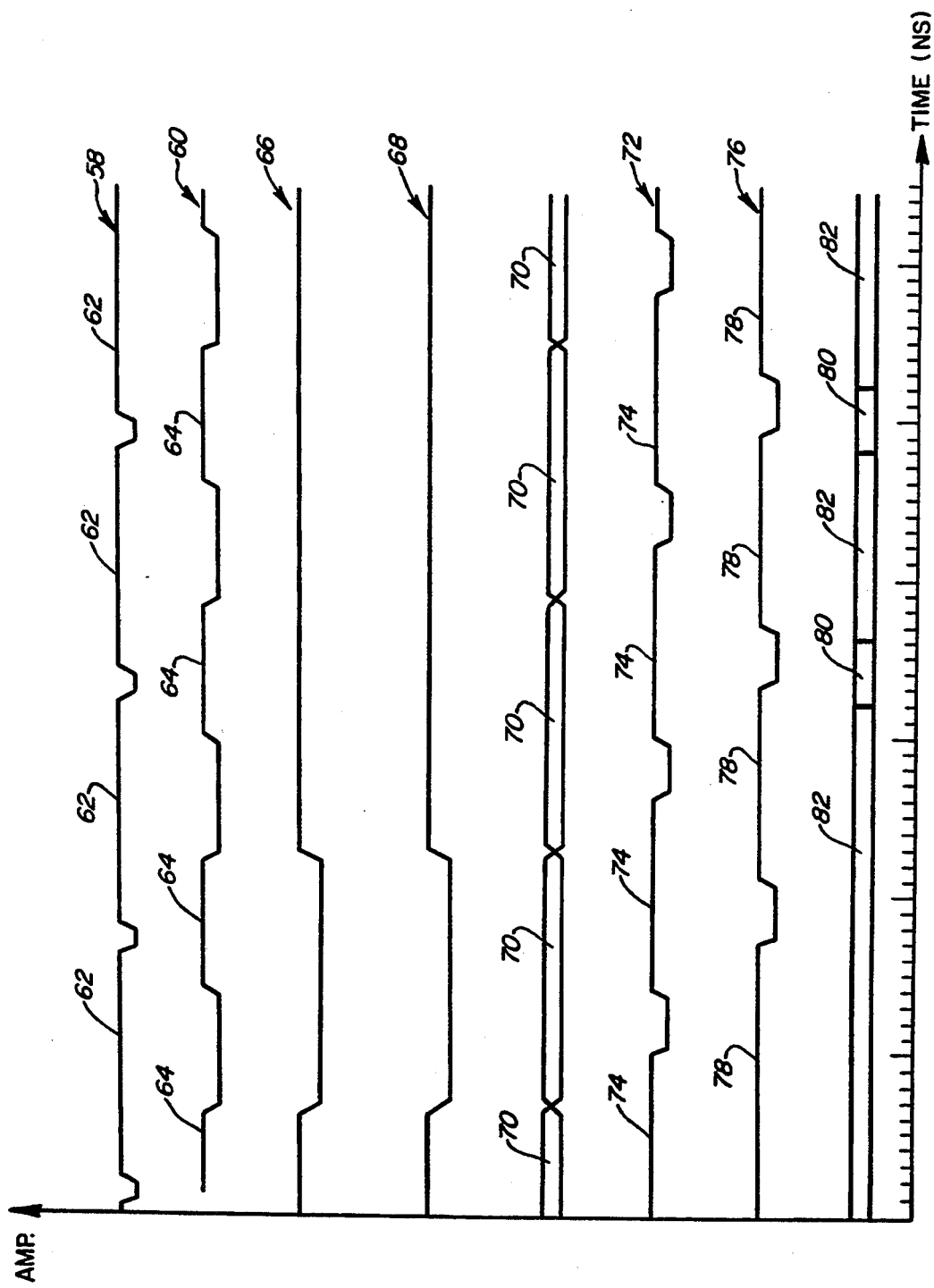
FIG. 2 is a graphical representation of data transfer timing signals for "high speed" programmed data transfer timing according to the present invention.

The latch control circuit 42 is timed by the first and second timing signals represented by the lines 58 and 60 respectively, and produces the first and second latch signals on the lines 12 and 44 respectively in FIG. 1, which signals are respectively represented in FIG. 2 by lines 66 and 68. The first and second latch signals represented by the lines 66 and 68 respectively are both synchronized with the trailing edge of the second reference timing signal pulses 64. The first latch signal represented by the line 66 and the second latch signal represented by the line 68 are asserted once per eight data transfers from the transmit latch 28.

The selector circuit 46 also receives the first and second timing signals on lines 54 and 56 respectively and is tuned to select new data at an interval of once per timing cycle upon the occurrence of the trailing edge of each second reference timing cycle signal pulse 64. The signal selection regions for the select signal output on the line 24 are represented by the areas 70 in FIG. 2.

The CPU clock control unit 52 also receives the first and second timing signals on lines 54 and 56 respectively and provides a programmable transmit latch signal on the transmit latch line 30. The transmit latch signal on the transmit latch line 30 at the CPU clock control unit 52 is represented by a line 72 in FIG. 2. The transmit latch signal represented by the line 72 has a continuous train of pulses 74 with a timing cycle, corresponding to the first reference signal on the line 58 and intervals between the pulses 74 on the order of ¼ of the timing cycle.

Because of the transmission delay involved on the line 30 between the CPU 2 and the memory unit 4, the transmit latch signal that arrives at the data word transmit latch 28 is delayed with respect to the transmit latch signal pulses at the CPU clock control unit 52. This delay depends upon various factors such as the length of the transmit latch line 30, and will vary between any given CPU 2 and memory unit 4, but is represented as approximately 7 ns in FIG. 2, wherein the delayed transmit latch signal received by the data word transmit latch 28 is represented by a line 76, with a continuous train of delayed transmit latch signal pulses 78. The line 76 with the pulses 78 corresponds to the transmit latch signal represented by the line 72 with the pulses 74 after the approximate 7 ns delay to the data word transmit latch 28 along the transmit latch line 30. The phase shift between the pulses 74 and the delayed pulses 78 is readily apparent in FIG. 2.

The delayed transmit latch signal represented by the line 76 is also fed from the line 30 at the CPU 2 to the clock inputs on the first and second data flip flops 34, 36 via the lines 38 and 40, respectively. The first and second data flip flops 34, 36 thereby only permit changes of state during the assertion of the delayed pulses 78 of the delayed transmit latch signal represented by the line 76. Thus, the second latch signal represented by the line 68 in FIG. 2 cannot pass from the first data flip flop line 44 to the second latch line 20 until the first data flip flop 34 is triggered by the leading edge of each of the delayed pulses 78. Likewise, the select signal produced by the selector circuit 46 does not pass from the second data flip flop line 48 to the select signal input line 24 until the second data flip flop 36 is triggered by the leading edge of each of the delayed pulses 78.

Consequently, the duration of the intervals between the delayed pulses 78 in the transmit latch signal as represented by the line. 76, produced by the CPU clock control unit 52, determines both the timing and duration of the selected data word transmitted on the line 26 from the multi data word multiplexer 22, passed through the transmit latch 28, and then sent back to the CPU 2 along the transmit latch output line 32 to the memory receive circuit 50. The memory receive circuit 50 also receives the first and second timing signals on the lines 54 and 56 respectively and conveniently latches the selected data word transmitted along the line 32 from the transmit latch 28 beginning at the leading edge of each timing pulse 62. The phasing of the transmit latch signal may be adjusted relative to the timing pulses 62 so that the phase shift between them permits a sufficient time delay to let the selected data word transmitted from the transmit latch 28 on the line 32 to reach the memory receive circuit 50 after the selector circuit 46 provides the select signal on the second data flip flop line 48. If the transmission-reception path period between the CPU 2 and the memory unit 4 is significant, the delay of the transmit latch signal on the line 30 may be adjusted to force the selected data word received at the memory receive circuit 50 to fall within a valid "data window" following the leading edge of one of the cyclic first reference signal timing pulses 62 in a CPU data transfer timing cycle two cycle periods or more following the CPU cycle in which the selected data word is selected by the selector circuit 46. The latch control circuit 42, the selector circuit 46, the clock control unit 52 and the memory receive circuit 50 are well known components which may be interconnected in a variety of well known configurations and are shown in block form in FIG. 1 for purposes of representation only, since they do not in themselves constitute part of the present invention.

For instance, in one typical system using the timing shown in FIG. 2, with a relatively high 16 nanosecond (ns) data transfer timing cycle rate, the transmission time for the transmit latch signal on the transmit latch line 30 between the CPU clock control unit 52 and the data word transmit latch 28 may typically be in the range of 5.5 to 8.8 ns. In addition, the reception time for the selected data word on the transmit latch output line 32 between the memory receive circuit 50 and the data word transmit latch 28 may typically be in the range of 5.3 to 12.5 ns. Therefore, the total transmission-reception signal delay between the CPU 2 and the memory unit 4 for the signals described above may range from 10.8 to 21.3 ns. Since this transmission-reception delay period can exceed the established 16 ns data transfer timing cycle, a programmed delay is provided between the leading edge of the cyclic timing pulses 62 of the first reference signal represented by the line 58 and the transmit latch signal represented by the line 68. For instance, the programmed delay may be selected from a plurality of different clock signals, each synchronized with the first reference signal represented by the line 58 and having different delays for the leading edges of their pulse trains relative to the leading edge of the first reference signal timing pulses 62. Suitable delays, for a given data cycle time $T_{DC}$, have been established as follows:

$$T4 = (4/8)T_{DC} - \tfrac{1}{2}$$

$$T5 = (\tfrac{5}{8})T_{DC} - \tfrac{1}{2}$$

$$T6 = (6/8)T_{DC} - \tfrac{1}{2}$$

wherein $T_{DC}$ is the data cycle time in nanoseconds, and T4, T5 and T6 are the suitable delay times in nanoseconds. If a 16 ns data cycle rate is used as described above, the values for T4, T5 and T6 will be 7.5, 9.5 and 11.5 ns respectively. Of course, additional delay times, or different ones, may be selected to be compatible with other transmission path conditions. The assertion time for each delayed clock signal is selected to permit the data word transmit latch 28 to transmit the selected data word on the transmit latch output line 32 for a sufficient period when received at the memory receive circuit 50 to read the selected data word in a valid data window. For this purpose, an appropriate assertion time may be established as follows:

$$T_A = (2/8)T_{DC}$$

wherein $T_{DC}$ is the data cycle time in nanoseconds, and $T_A$ is the assertion time for the selected transmit latch signal on the transmit latch line 30. Thus, for the 16 ns data timing cycle shown in FIG. 2, the value of $T_A$ is 4 ns.

As shown in FIG. 2, the trailing edge of each of the pulses 74 of the transmit latch signal represented by the line 72 is shown with the T5 delay of 9.5 ns relative to the trailing edges of the pulses 62 of the first reference timing signal represented by the line 58. The trailing edge of each of the pulses 62 occur approximately 0.5 ns after the start of each timing cycle for the first reference signal represented by the line 58. The transmission-reception delay between the CPU 2 and the memory unit 4 is shown as approximately 21.5 ns, approximately 7 ns between the CPU clock control unit 52 and the data word transmit latch 28, and approximately 14.5 ns between the data word transmit latch 28 and the memory receive circuit 50. Thus, a trailing edge of each one of the transmit latch signal pulses 74 is sent from the CPU clock control unit 52 approximately 9.5 ns after a corresponding trailing edge of each one of the first reference timing signal pulses 62. The corresponding trailing edge of each one of the delayed transmit latch signal pulses 78 reaches the data word transmit latch 28 on the line 30 approximately 7 ns later. The interval between the delayed pulses 78 is approximately 4 ns to allow the first and second data flip flops 34, 36 to pass the second latch signal on the line 44 into the data word latch 16 and the select signal on the line 48 into the multi data word multiplexer 22, and then to transmit the selected data word through the data word transmit latch 28 on the line 32 for approximately 4 ns so that the selected data word is recoverable by the memory receive circuit 50. After each 4 ns interval between the transmit latch signal delayed pulses 78, the leading edge of each subsequent delayed pulse 78 latches in the next selected data word by locking the states of the first and second data flip flops 34, 36 with the delayed latch transmit signal pulses 78 fed into their inverted clock inputs. Thus, the next selected data word is held for the transmit phase of the subsequent data transfer cycle. The total transmitted data word on the line 32 is received by the memory receive circuit 50 in the CPU 2 approximately 14.5 ns after release by the data word transmit latch 28. The transmitted selected data word sequence received by the memory receive circuit 50 on the line 32 is represented by the sequential regions 80 and 82 in FIG. 2, where the regions 80 represent the sequentially received selected data words and the regions 82 represent the intervals between the selected data words. Consequently, each selected data word arrives at the memory receive circuit 50 a total of 31 ns after the trailing edge of the corresponding initiating first reference timing pulse 62 described above, which synchronizes it to arrive with the trailing edge of one of the first reference timing pulses 62 which follows two data transfer timing cycles later. Of course, the programmed delay can be changed to "fine tune" the system by substituting a different value of delay, such as that designated T4 or T6, as described above, or some other value.

The programmed delay for the transmit latch signal pulses 74 may also be selected as zero when the data transfer timing cycle is low enough that the selected data word transmitted by the data word transmit latch 28 in the memory unit 4 can reach the memory receive circuit 50 of the CPU 2 within the data window of a data transfer timing cycle which follows the cycle including the initiating first reference timing pulse 62 described above. The programmed delay in this case is designated T0.

Figure 3:
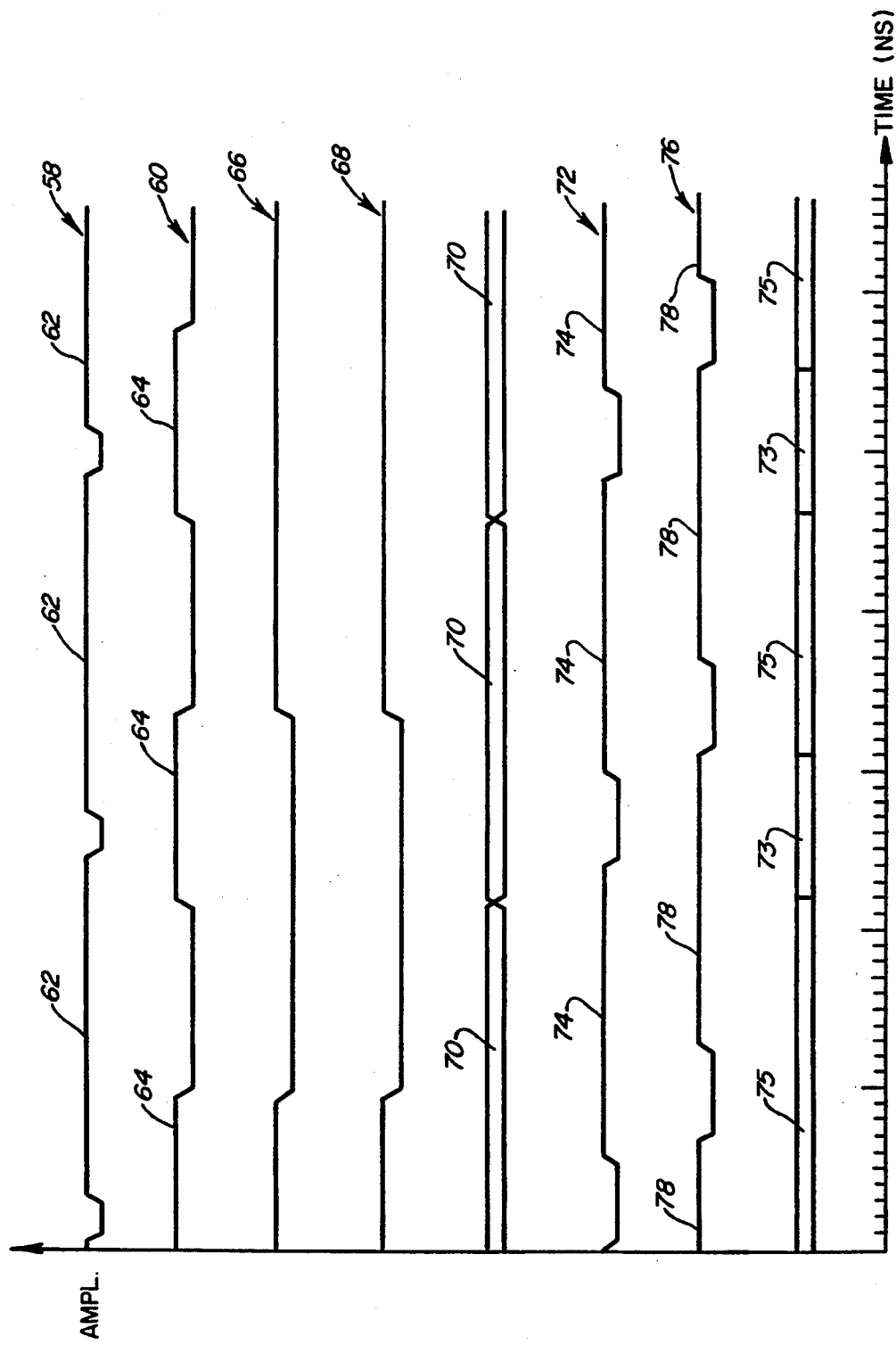
FIG. 3 is a graphical representation of data transfer timing signals for "single step" programmed data transfer timing according to the present invention.

FIG. 3 shows a graphical representation of the signals shown in FIG. 2 which have cyclic periods modified for a data transfer timing cycle of 24 ns. The trailing edge of each of the transmit latch pulses 74 are sent out simultaneously with the trailing edge of each first reference timing signal pulse 62, since the programmed delay for the pulses 74 is zero. The transmission-reception delay between the CPU 2 and the memory unit 4 is shown once again as approximately 21.5 ns, approximately 7 ns between the CPU clock control unit 52 and the data word transmit latch 28, and approximately 14.5 ns between the data word transmit latch 28 and the memory receive circuit 50. Thus, a trailing edge of each one of the transmit latch signal pulses 74 is sent from the CPU clock control unit 52 simultaneously with a corresponding trailing edge of each one of the first reference timing signal pulses 62. The corresponding trailing edge of each one of the delayed transmit latch signal pulses 78 reaches the data word transmit latch 28 on the line 30 approximately 7 ns later. The interval between the delayed pulses 78 is for a period $T_A$ as defined above, but for the 24 ns data transfer timing cycle, which is:

$$T_A = (2/8)24,$$

or approximately 6 ns. The interval between the delayed pulses 78 allows the first and second flip flops 34, 36 to pass the second latch signal on the line 44 into the data word latch 16 and the select signal on the line 48 into the multi data word multiplexer 22, and then to transmit the selected data word through the data word transmit latch 28 on the line 32 for approximately 6 ns so that the selected data word is recoverable by the memory receive circuit 50. After each 6 ns interval between the delayed transmit latch pulses, the leading edge of each subsequent delayed pulse 78 latches in the next selected data word by locking the states of the first and second data flip flops 34, 36 with the delayed latch transmit signal pulses 78 fed into their inverted clock input. Thus, the next selected data word is held for the transmit phase of the subsequent data transfer cycle. The transmitted data word on the line 32 is received by the memory receive circuit in the CPU 2 approximately 14.5 ns after release by the data word transmit latch 28. Consequently, the selected data word arrives at the memory receive circuit 50 a total of 21.5 ns after the trailing edge of the corresponding initiating first reference timing pulse 62 described above, which synchronizes it to arrive first before, and during, the trailing edge the one of the first reference timing pulses 62 which follows in the immediately subsequent data transfer timing cycle. Thus, the data transmission between the CPU 2 and the memory unit 4 is synchronized to receive data a single data transfer cycle after the CPU selects a data-word from the memory unit 4. This operation allows "single step" function operation where the clocks stop and start. For this "single step" data transfer sequencing, the select signal on the line 48 sequentially transmits each selected data word for a complete data transfer cycle beginning with the leading edge of each corresponding second reference signal pulse 64. This insures that the proper value of the select signal is locked into the multiplexer 22 by the second data type flip flop 36. In contrast, for "high speed" data transfer cycling as described above in connection with FIG. 2, the select signal on the line 48 sequentially transmits each selected data word for a complete data transfer cycle beginning with the trailing edge of each corresponding second signal reference pulse 64. Thus, for "high speed" data transfer timing the select signal is delayed a half cycle of the data transfer cycle compared with single step operation.

Likewise, for all data transfer timing cycles having periods greater than about 23 ns, the same data transfer timing cycle as described above for single step timing is implemented since the transmission-reception delay between the CPU 2 and the memory unit 4 is sufficiently small in all cases so that the selected data words received by the memory receive circuit 50 may be read in a valid data window of its data transfer cycle without a programmed delay period.

It will be understood that various changes in the details, arrangements and configurations of the parts and assemblies which have been described and illustrated above in order to explain the nature of the present invention may be made by those skilled in the art within the principle and scope of the invention as expressed in the appended claims.

What is claimed is:

1. A memory device for transferring data to a central processing unit having a reference clock and a transmit latch signal via a data path between said memory device and said central processing unit, comprising:
   a first latch for latching selected serial source data from said memory device in synchronization with said reference clock from said central processing unit connected thereto;
   a first synchronizing means having a clock input and a data input, the first synchronizing means generating a latch signal in synchronization with a transmit latch signal from said central processing unit received on the clock input of said first synchronizing means and said reference clock from said central processing unit received on the data input of said first synchronizing means;
   a second latch for latching a plurality of multi-bit data words from said latched serial source data in synchronization with said latch signal from said first synchronizing means;
   a second synchronizing means having a clock input and a data input, the second synchronizing means generating a select signal in synchronization with said transmit latch signal from said central processing unit received on the clock input of said second synchronizing means and a select signal from said central processing unit received on the data input of said second synchronizing means;
   means for latching a selected one of said multi-bit data words in synchronization with said select signal from said second synchronizing means; and,
   means for transferring said selected one of said multi-bit data words to said central processing unit in synchronization with said transmit latch signal from said central processing unit, said transmit latch signal having a clock delay relative to said reference clock, said clock delay having a delay corresponding to a minimum transmission-reception delay period of said data path.

2. The memory device of claim 1 wherein the first synchronizing means is a data flip-flop.

3. The memory device of claim 1 wherein the second synchronizing means is a data flip-flop.

4. The memory device of claim 1 wherein the means for latching a selected one of said multi-bit data words in synchronization with said select signal from said second synchronizing means is a multiplexer.

5. A memory device for transferring data to a central processing unit having a reference clock and a transmit latch signal via a data path between said memory device and said central processing unit, comprising:
   a first latch for latching selected serial source data from said memory device in synchronization with said reference clock from said central processing unit connected thereto;
   a first data flip-flop for generating a latch signal in synchronization with a transmit latch signal from said central processing unit received on a clock input of said first data flip-flop and said reference clock from said central processing unit received on a data input of said first data flip-flop;
   a second latch for latching a plurality of multi-bit data words from said latched serial source data in synchronization with said latch signal from said first data flip-flop;
   a second data flip-flop for generating a select signal in synchronization with said transmit latch signal from said central processing unit received on a clock input of said second data flip-flop and a select signal from said central processing unit received on a data input of said second data flip-flop;
   means for latching a selected one of said multi-bit data words in synchronization with said select signal from said second data flip-flop; and,
   means for transferring said selected one of said multi-bit data words to said central processing unit in synchronization with said transmit latch signal from said central processing unit, said transmit latch signal having a clock delay relative to said reference clock, said clock delay having a delay corresponding to a minimum transmission-reception delay period of said data path.

6. A data processing system comprising:
   a central processing unit, the central processing unit having a reference clock and a transmit latch signal; and
   a memory device for transferring data to the central processing unit via a data path between said memory device and said central processing unit, the memory device further comprising:
   a first latch for latching selected serial source data from said memory device in synchronization with said reference clock from said central processing unit connected thereto;
   a first synchronizing means having a clock input and a data input, the first synchronizing means generating a latch signal in synchronization with a transmit latch signal from said central processing unit received on the clock input of said first synchronizing means and said reference clock from said central processing unit received on the data input of said first synchronizing means;
   a second latch for latching a plurality of multi-bit data words from said latched serial source data in synchronization with said latch signal from said first synchronizing means;

a second synchronizing means having a clock input and a data input, the second synchronizing means generating a select signal in synchronization with said transmit latch signal from said central processing unit received on the clock input of said second synchronizing means and a select signal from said central processing unit received on the data input of said second synchronizing means;

means for latching a selected one of said multi-bit data words in synchronization with said select signal from said second synchronizing means; and, means for transferring said selected one of said multi-bit data words to said central processing unit in synchronization with said transmit latch signal from said central processing unit, said transmit latch signal having a clock delay relative to said reference clock, said clock delay having a delay corresponding to a minimum transmission-reception delay period of said data path.

7. The memory device of claim 6 wherein the first synchronizing means is a data flip-flop.

8. The memory device of claim 6 wherein the second synchronizing means is a data flip-flop.

9. The memory device of claim 6 wherein the means for latching a selected one of said multi-bit data words in synchronization with said select signal from said second synchronizing means is a multiplexer.

* * * * *